July 26, 1966  L. L. GENUIT  3,263,125
CURRENT LIMITING CIRCUITS AND APPARATUS FOR OPERATING
ELECTRIC DISCHARGE DEVICES AND OTHER LOADS
Filed May 1, 1963  3 Sheets-Sheet 1
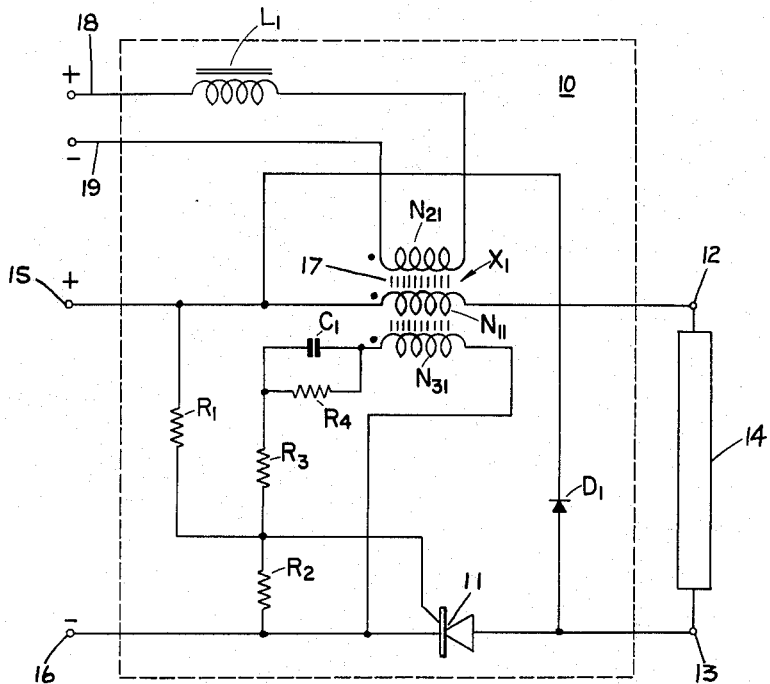
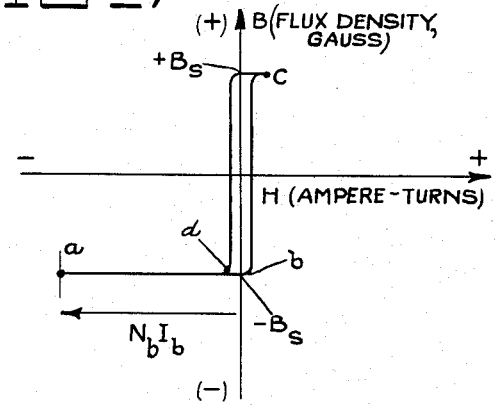
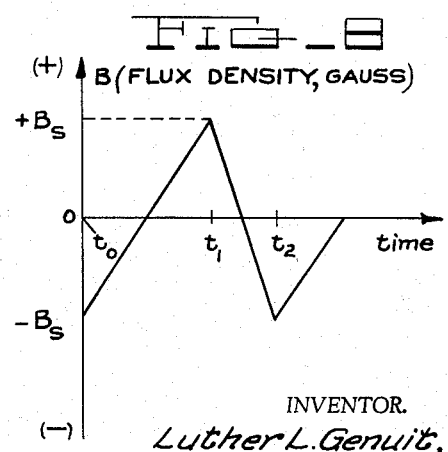
INVENTOR.
Luther L. Genuit,
BY Henry J. Marciniak
Attorney.

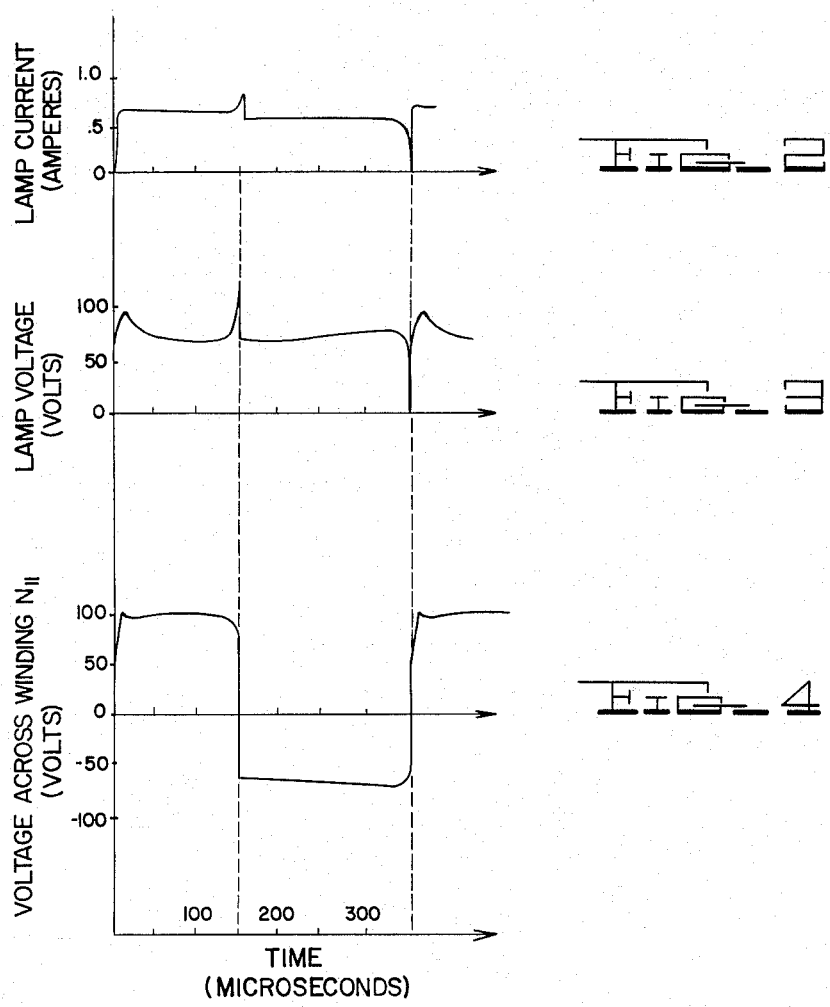

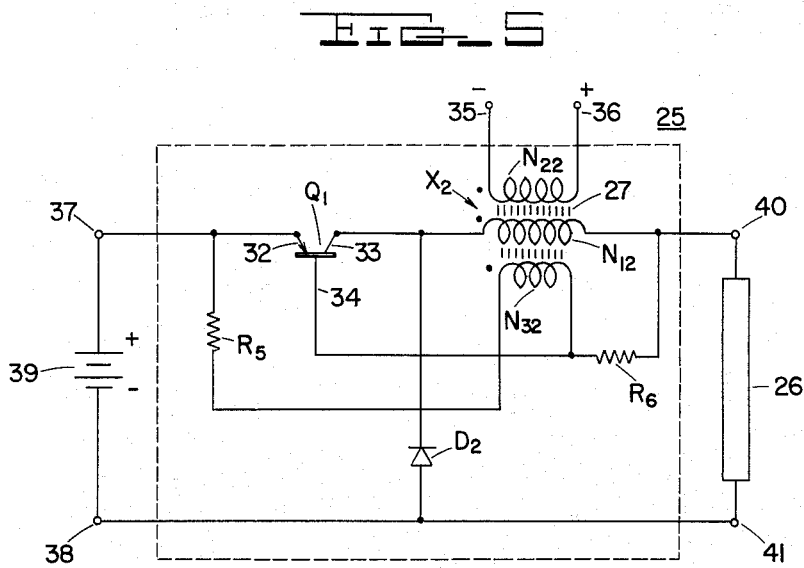
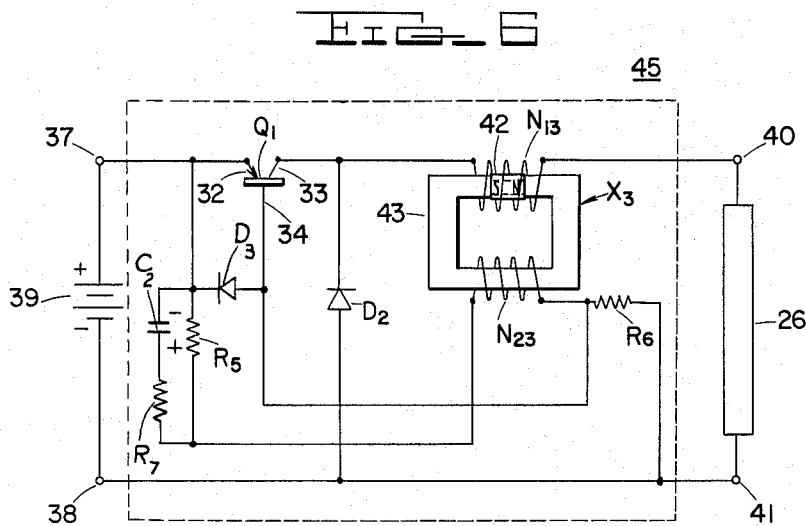

_United States Patent Office_ 3,263,125
Patented July 26, 1966

3,263,125
CURRENT LIMITING CIRCUITS AND APPARATUS FOR OPERATING ELECTRIC DISCHARGE DEVICES AND OTHER LOADS
Luther L. Genuit, Danville, Ill., assignor to General Electric Company, a corporation of New York
Filed May 1, 1963, Ser. No. 277,355
20 Claims. (Cl. 315—219)

This invention relates to current limiting circuits and more particularly to such current limiting circuits which are suitable for operating loads, such as electric discharge lamps, having essentially a negative impedance characteristic.

There has been a long standing need for efficient and relatively simple circuits employing semiconductor devices for operating electric discharge lamps of the fluorescent type. In conventional current limiting circuits used to operate fluorescent lamps with direct current, the current supplied to the lamp is limited by placing a resistor in series circuit with the lamp. A disadvantage of such current limiting circuits is that a relatively large amount of the power, usually about fifty percent of the power supplied, is dissipated in the resistor. In conventional A.C. current limiting circuits reactive elements are used, and the peak energy stored in these elements must be maintained at relatively high levels to perform the current limiting function. The disadvantage of such circuits is that relatively bulky and expensive reactive devices are required.

It is therefore a general object of the present invention to provide an improved current limiting circuit for use in conjunction with loads having essentially a negative impedance characteristic.

Another object of the present invention is to provide an improved current limiting circuit for operating electric discharge devices such as fluorescent lamps.

A more specific object of the invention is to provide an improved current limiting circuit that is relatively more efficient than conventional circuits employing resistors as current limiting elements.

It is still a further object of the invention to provide an improved current limiting circuit for operating one or more fluorescent lamps with a D.C. potential.

Another object of the present invention is to provide a current limiting circuit employing a single semiconductor switching device and a saturating reactor having a relatively small volt-second and volt-ampere rating.

Briefly stated, I have provided in accordance with one form of my invention a current limiting circuit employing a semiconductor switching device operable between a low and a high impedance condition and a saturating reactor. A semiconductor switching device and a saturating reactor are adapted for connection in circuit with a load to place the load, the switching device and the saturating reactor in series circuit relation across the power source. The saturating reactor includes a saturable core, a main winding and a means associated with the saturable core for storing energy and for establishing a bias magnetomotive force in opposing relation to the magnetizing magnetomotive force of the main winding. The semiconductor device is switched to the high impedance condition in response to the condition of saturation of the saturating reactor to interrupt the supply of potential to the saturating reactor and the load to allow the reactor to recover. During the high impedance condition of the semiconductor device, the saturating reactor sustains the supply of current to the load. During the low impedance condition the high unsaturated inductance of the reactor holds the load current at a predetermined level. Thus, during both the high and the low impedance conditions of the semiconductor device, the reactor effectively limits the current supplied to the load.

It will be appreciated that different types of semiconductor devices may be employed as switching elements in the practice of the invention. In one form of my invention, a gate-turn-off controlled rectifier is employed as a switching element and in another form of the invention a transistor is similarly employed as a switching element to interrupt the supply of potential and to allow the saturating reactor to recover.

Further aspects of the invention will become apparent from a more detailed description of the invention. It will be understood that the specification concludes with claims that particularly point out and distinctly claim the subject matter which I regard as my invention. The invention, however, both as to organization and method of operation together with further objects and advantages thereof, may be best understood by reference to the following description taken in conjunction with the accompanying drawings in which:

FIGURE 1 is a schematic circuit diagram of a current limiting circuit embodying one form of the invention and adapted for operating one or more fluorescent lamps;

FIGURE 2 illustrates the lamp current waveform corresponding to one complete switching cycle of the current limiting circuit shown in FIGURE 1;

FIGURE 3 illustrates the lamp voltage wareform for one complete switching cycle of the current limiting circuit shown in FIGURE 1;

FIGURE 4 illustrates the voltage waveform across the main winding $N_{11}$ of the reactor $X_1$ of the current limiting circuit of FIGURE 1;

FIGURE 5 is a schematic circuit diagram of a current limiting circuit employing a PNP transistor as a switching element;

FIGURE 6 is a schematic circuit diagram of a current limiting circuit in which a permanent magnet is employed in the saturating reactor as a bias magnetomotive force means;

FIGURE 7 illustrates a B–H characteristic curve for the saturable core used in the current limiting circuit of FIGURE 5; and FIGURE 8 represents a plot of the flux density B against time for an arbitrary cycle of operation of the saturating reactor $X_2$.

In the current limiting circuit 10 shown schematically in FIGURE 1, a gate-turn-off controlled rectifier 11 and a saturating reactor $X_1$ are connected in circuit with the output terminals or leads 12, 13 which are connected with a fluorescent lamp 14. When the fluorescent lamp 14 or other load is connected with output leads 12, 13 it will be seen that the gate-turn-off controlled rectifier 11, the saturating reactor $X_1$, and fluorescent lamp 14 are connected in series circuit relation across the terminals or leads 15, 16 provided for connection to a D.C. source of potential.

When the gate-turn-off controlled rectifier 11 is triggered to its high impedance condition, the supply of potential from the D.C. source is interrupted. The diode $D_1$ provides a path, that shunts the D.C. source, for current flow during the release of energy from the choke $L_1$ through the saturating reactor $X_1$ when the supply of potential from the D.C. source is interrupted. The gate-turn-off controlled rectifier 11 is initially fired by current supplied through the resistor $R_1$ connected in circuit with terminal 15 provided for connection to the positive side of the D.C. supply. The resistor $R_2$ connected across the gate-cathode junction of the gate-turn-off controlled rectifier 11 prevents erratic turn-on due to anode-gate leakage current.

Saturating reactor $X_1$ is comprised of a saturable core 17, a main winding $N_{11}$, a bias winding $N_{21}$ and an auxiliary winding $N_{31}$. The saturable core 17 used in the illustrative embodiment of the invention was a toroidal core made of sharply saturating material. When the core 17 is saturated, the impedance of the saturating reactor $X_1$ is very low. During the unsaturated condition of the core 17 a relatively high inductive impedance is presented to current flow.

The bias winding $N_{21}$ is connected by terminal leads 18, 19 to a source of D.C. bias through a choke $L_1$. The number of ampere-turns provided by the bias winding $N_{21}$ is such that the current through the main winding $N_{11}$ will stabilize at a predetermined level during the unsaturated condition of the core 17. As will hereinafter be more fully described, in the apparatus 10 reduced to practice the terminal leads 18, 19 were connected in circuit with a filtered D.C. supply which provided a bias current of 1.8 amperes.

The auxiliary winding $N_{31}$ is coupled across the gate-cathode junction of the gate-turn-off controlled rectifier 11 to switch the controlled rectifier 11 to a high impedance condition in response to the condition of saturation of the saturating reactor $X_1$. It will be noted that the auxiliary winding $N_{31}$ is connected at one end in circuit with a capacitor $C_1$, a resistor $R_3$ and a bleeder resistor $R_4$. At the other end the auxiliary winding $N_{31}$ is connected in circuit with the cathode of the controlled rectifier 11.

During the unsaturated condition of the saturable reactor $X_1$, capacitor $C_1$ is charged, and when the saturating reactor $X_1$ reaches saturation, capacitor $C_1$ discharges through the cathode-gate junction of the gate-turn-off controlled rectifier 11. The resistor $R_3$ controls this discharge so that the bias on the cathode-gate junction of the controlled rectifier 11 is of sufficient duration and amplitude to turn off the device.

The gate-turn-off controlled rectifiers which may be used in the embodiment of the invention illustrated in FIGURE 1 are silicon PNPN semiconductor devices and are generally similar to silicon controlled rectifiers except that the gate-turn-off devices can be turned off with a negative gate signal. In other words, a gate-turn-off controlled rectifier can be readily switched on and off with a gate signal.

As will be seen from the lamp current and lamp voltage waveforms shown in FIGURES 2 and 3, the current limiting circuit 15 provides a unipolar output which operates the lamp 14. This output is cyclical in that for a 150 microsecond interval during which the gate-turn-off controlled rectifier 11 is conducting, power to the lamp 14 is supplied from the source. During a 200 microsecond interval in each cycle the gate-turn-off controlled rectifier 11 is turned off, and the energy stored in the choke $L_1$ through the reactor $X_1$ during the preceding 150 microsecond interval is released to sustain the operation of the lamp 14.

Let us now first consider the operation of the current limiting circuit 10 during the first portion of the cycle when the gate-turn-off controlled rectifier 11 is in the low impedance or conducting condition. Initially, the controlled rectifier 11 is switched to the low impedance condition by the current supplied from the source through the resistor $R_1$. With controlled rectifier 11 in the low impedance condition, the current level through the winding $N_{11}$ of the saturating reactor $X_1$ immediately rises to the level at which the magnetizing magnetomotive force of the main winding $N_{11}$ is essentially equal to the bias magnetomotive force of the D.C. bias winding $N_{21}$. As will be seen from the waveform of the lamp current shown in FIGURE 2, the lamp current remains substantially constant at this level until the saturable core 17 reaches saturation. During this initial portion of the cycle, the capacitor $C_1$ coupled with the auxiliary winding $N_{31}$ is charged with a voltage having a polarity such that the right plate, as seen in FIGURE 1, is positive with respect to the left plate. When reactor $X_1$ saturates, the voltage across winding $N_{31}$ falls off, and capacitor $C_1$ discharges through the winding $N_{31}$, the cathode-gate junction of the gate-turn-off controlled rectifier 11 and through the resistor $R_3$ causing the controlled rectified 11 to switch to its high impedance condition. With the controlled rectifier 11 in the high impedance or off condition, the power supplied to the lamp 14 from the D.C. source is interrupted by the rectifier 11, and as a consequence, the voltage across the main winding $N_{11}$ of the saturating reactor $X_1$ reverses. The load current is now maintained by the saturating reactor $X_1$ which draws energy from choke $L_1$. The choke $L_1$ discharges through winding $N_{21}$ inducing current in the main winding $N_{11}$. This current flows through the main winding $N_{11}$, terminal 12, the lamp 14, terminal 13 and the diode $D_1$. During the high impedance condition of the gate-turn-off controlled rectifier 11, the saturating reactor $X_1$ maintains a substantially constant flow of current to the lamp 14 until it approaches the end of its recovery period. During this period capacitor $C_1$ is charged with a voltage having a polarity such that the left plate, as seen in FIGURE 1, is positive with respect to the right plate. As the voltage across the main winding $N_{11}$ falls off to zero at the end of the recovery period, the capacitor $C_1$ discharges again and switches the gate-turn-off controlled rectifier 11 to its low impedance condition to initiate another symmetrical cycle of operation.

As used herein, the terms "recover" or "recovery" denote the return of the saturable core to its initial condition of saturation as determined by the applied D.C. bias magnetomotive force when the magnetizing magnetomotive force of the main winding is essentially zero.

By way of a more specific exemplification of the invention, the current limiting circuit 10 shown in FIGURE 1 was constructed and reduced to practice to operate a 36T12 rapid start fluorescent lamp. The following specifications of the circuit components used are given by way of an illustration of a specific application:

| | |
|---|---|
| Gate-turn-off controlled rectifier 11 | Texas Instruments TIX120A2. |
| Saturating reactor $X_1$: | |
| Saturable core 17 | Toroidal core Arnold 2T4635D2. |
| Main winding $N_{11}$ | 190 turns of .0142 inch in diameter wire. |
| Bias winding $N_{21}$ | 62 turns of .032 inch in diameter wire. |
| Auxiliary winding $N_{31}$ | 19 turns of .0142 inch in diameter wire. |
| Resistor $R_1$ | 5,000 ohms. |
| Resistor $R_2$ | 47 ohms. |
| Resistor $R_3$ | 27 ohms. |
| Resistor $R_4$ | 470 ohms. |
| Capacitor $C_1$ | 0.25 microfarad. |
| Diode $D_1$ | 4JA10D. |

The fluorescent lamp 14 was initially ignited by applying a 400 volt pulse between a lamp anode and a grounded conductive strip disposed in capacitive relationship with the lamp. It will be appreciated that the current limiting circuit was not designed to provide the starting voltage required to initially ignite the lamp. To operate the lamp 14 the terminals 15 and 16 were connected in circuit with a 150 volt D.C. supply, and the D.C. bias terminals 18, 19 were connected with a D.C. supply providing a current of 1.8 amperes. Since a rapid start type of fluorescent lamp was operated, a 60 cycle filament transformer was connected to the lamp filaments to provide a filament heating current. After the lamp 14 was started, the filament transformer was disconnected, and the lamp current, lamp voltage waveform and reactor voltage waveforms were observed on a cathode ray oscilloscope. These waveforms are shown in FIGURES 2, 3 and 4, respectively. It will be noted from the waveforms that the gate-turn-off controlled rectifier 11 is switched to a low impedance and high impedance condition at a frequency of approximately 2.86 kilocycles.

Referring now more particularly to the schematic circuit diagram of FIGURE 5, I have illustrated therein a current limiting circuit or apparatus 25 embodying one form of the invention for operating a load 26 with a regulated unidirectional current. The apparatus 25 is shown enclosed in a dashed rectangle and includes a transistor $Q_1$ having an emitter, collector and base electrodes 32, 33, 34, a reactor $X_2$, a diode $D_2$ and the resistors $R_5$, $R_6$. The saturating reactor $X_2$ is similar to the saturating reactor used in the FIGURE 1 embodiment of the invention and includes a saturable core 27 preferably made of magnetic material having a substantially square hysteresis loop. A main winding $N_{12}$, a bias winding $N_{22}$ and an auxiliary winding $N_{32}$ are wound on the saturable core 27. The auxiliary winding $N_{32}$ is coupled across the emitter and base electrodes 32, 34 of transistor $Q_1$. The D.C. bias winding $N_{22}$ connected in circuit with terminals or leads 35, 36 is adapted for connection to a suitable D.C. bias source including a serially-connected D.C. choke (not shown) terminal 35 being adapted for connection to the negative side of the bias source and terminal 36 for connection to the positive side. A D.C. potential is supplied to the aparatus 25 by connecting input terminals or leads 37, 38 to a D.C. source 39. During operation, a regulated D.C. current is supplied by the apparatus 25 at output terminals or leads 40, 41.

Although the apparatus 25 is shown as being adapted for connection to a D.C. power source and a separate bias source, it will be appreciated that a single D.C. power supply may be used to provide the bias current for the winding $N_{22}$ and the power for operating the load 26. In series with the D.C. bias winding, however, a D.C. choke $L_1$ must be provided to suppress harmonic currents in the bias winding.

The embodiment of the invention shown in FIGURE 6 differs from the embodiment shown in FIGURE 5 in that a permanent magnet 42 is inserted in the gap of a saturable core 43 to provide the bias magnetomotive force. In other respects, apparatus 45 is essentially similar to apparatus 25. Accordingly, the corresponding components of apparatus 25 and 45 are identified by the same reference numerals and letters.

In order to start the operation of the circuit shown in FIGURE 5, the input terminals 37, 38 are connected in circuit with the positive and negative sides of a D.C. potential source, and terminals 35, 36 of the apparatus 25 are connected in circuit with a suitable D.C. bias source. The switching of transistor $Q_1$ into a low impedance condition is initiated by a small emitter-base current flowing through $R_6$. Regenerative turn-on of $Q_1$ follows in response to additional base drive current supplied by auxiliary winding $N_{32}$ of reactor $X_2$. The current through the main winding $N_{12}$ of the saturating reactor $X_2$ immediately rises to the level required to provide the magnetizing ampere-turns to cancel the magnetomotive force provided by the bias means.

In the apparatus 25 of FIGURE 5, the turns ratio $N_{22}/N_{12}$ of the saturating reactor $X_2$ was approximately ⅛ for the illustrated exemplification of the invention to be hereinafter more fully described. With this turn ratio the load current stabilized approximately at a level which was ⅛ of the magnitude of the D.C. bias current. If the number of turns of windings $N_{12}$ and $N_{22}$ are equal, it will be understood that the load current will stabilize at a value such that it is essentially equal in magnitude to the D.C. bias current.

During the interval that the reactor $X_2$ is in an unsaturated condition, it presents a high impedance to any further increase in the current until the reactor $X_2$ reaches saturation, and during this interval the current is held essentially at a constant level by the saturating reactor $X_2$. Further, during this interval the saturating reactor $X_2$ is absorbing volt-seconds, and the voltage across the winding $N_{32}$ is such that the end of the winding $N_{32}$ with the polarity dot is positive with respect to the other end. A voltage of such polarity renders the base electrode 34 negative with respect to the emitter electrode 32, and transistor $Q_1$ is maintained in its low impedance condition as the reactor $X_2$ approaches saturation.

When the core 27 of the saturating reactor $X_2$ begins to enter saturation, the voltage across the windings $N_{12}$ and $N_{32}$ drops off sharply. This results in a sharp decline in the base drive supplied to the transistor $Q_1$, and transistor $Q_1$ begins to turn off. The voltage across winding $N_{12}$ of reactor $X_2$ reverses as transistor $Q_1$ is switched to its high impedance condition. Also, the voltage across the auxiliary winding $N_{32}$ reverses. As a result of these voltage reversals, a reverse bias is applied across the emitter-base junction of transistor $Q_1$, and diode $D_2$ is now forwardly biased. The energy stored in the D.C. choke through the reactor $X_2$ during the low impedance condition of transistor $Q_1$ is now discharged through the load 26. Current flows in a loop which includes the main winding $N_{12}$, output terminal 40, load 26, output terminal 41 and diode $D_2$. When the voltage across the main winding $N_{12}$ collapses, the reverse bias across the emitter-base junction of transistor $Q_1$ is removed. Transistor $Q_1$ is again switched to a low impedance condition, and another cycle of operation commences.

While it is understood that the circuit specifications of the apparatus of the present invention may be varied depending on a particular application, the following circuit components were used in the apparatus 25 shown in FIGURE 5 as actually reduced to practice by me and are given by way of an illustration of a specific exemplification of the invention:

| | |
|---|---|
| Transistor $Q_1$ | Texas Instruments 4JA11D. |
| Diode $D_2$ | General Electric 4JA11D. |
| Resistor $R_5$ | 470 ohms. |
| Resistor $R_6$ | 15,000 ohms. |
| Load 26 | 25 ohms. |
| Voltage source 39 | 25 volts D.C. |
| Bias current supply | 3.5 amperes. |
| Saturating reactor $X_4$: | |
| Saturable core 27 | Arnold toroidal core 2T4635D2. |
| Winding $N_{12}$ | 80 turns of .0142 inch in diameter wire. |
| Winding $N_{22}$ | 10 turns of .032 inch in diameter wire. |
| Winding $N_{32}$ | 18 turns of .0142 inch in diameter wire. |

The apparatus 45 illustrated in FIGURE 6 operates in essentially the same manner as the apparatus 25 shown in FIGURE 5. It will be noted, however, that the bias magnetomotive force in the saturating reactor $X_3$ is provided by a permanent magnet insert 42. Further, I have included a speed-up capacitor $C_2$ and a resistor $R_7$ to limit the discharge current of the capacitor $C_2$. By connecting this network across the base drive resistor $R_5$, it was found that spikes in the load current occurring when the reactor $X_3$ saturates and "out" periods following the recovery of the reactor $X_3$ could be effectively reduced. A diode $D_3$ may be connected across the emitter-base junction of transistor $Q_1$, as shown, to prevent the junction from being damaged by an excessive reverse bias. The saturable core 43 of the reactor $X_3$ is comprised, preferably, of sharply saturating core material. The charge stored in the capacitor $C_2$ during "on" and "off" periods of the transistor $Q_1$, provides additional drive current during switching. When transistor $Q_1$ is in the low impedance or "on" condition, the polarity of the charge on the capacitor $C_2$ is as shown in FIGURE 6. When the reactor $X_3$ saturates, the capacitor $C_2$ discharges through winding $N_{23}$ to promote a fast turn-off of the transistor $Q_1$. When transistor $Q_1$ is in the high impedance or "off" condition, a charge builds up on capacitor $C_2$ that is of opposite polarity to that shown in FIGURE 6. Upon completion of the recovery of reactor $X_3$, the voltage across the reactor $X_3$ collapses, and capacitor $C_2$ discharges through winding $N_{23}$ to initiate the turn-on of transistor $Q_1$.

The permanent magnet insert 42 functions substantially in the same manner as the bias windings used in the other illustrated embodiments of the invention. When load current flows in the winding $N_{13}$, the magnetomotive force of the permanent magnet insert 42 opposes the magnetizing ampere-turns of winding $N_{13}$. Thus, as the magnetizing magnetomotive force of the main winding $N_{13}$ cancels the opposing magnetomotive force of the permanent magnet insert 42, the reactor $X_3$ presents a high impedance to an increase in the current through the main winding $N_{13}$. In this manner the current is maintained at a level determined by the relative magnitudes of the parameters, the magnetizing magnetomotive force of the main winding $N_{13}$ and the bias magnetomotive force provided by the permanent magnet insert 42.

During operation the current through the main winding $N_{13}$ and to the load almost immediately come up to the predetermined level at which the magnetizing magnetomotive force is essentially equal to the bias magnetomotive force of the permanent magnet insert 42. The auxiliary winding $N_{23}$ of the reactor $X_3$ provides the forward base drive during the low impedance condition of transistor $Q_1$ and also, in response to the condition of saturation of the saturable core 43, causes the transistor $Q_1$ to be switched to its high impedance condition.

The output current supplied at terminals 40, 41 by apparatus 45 is made up of unidirectional cycles of current. During the portion of the cycle when transistor $Q_1$ is in a low impedance condition, load current is supplied from the power source 39 and controlled at a substantially constant level by the saturating reactor $X_3$ as described above. During the portion of the cycle when the current from the power source 39 is interrupted by the transistor $Q_1$ to allow the saturating reactor $X_3$ to recover, the current to the load 26 is sustained by the reactor $X_3$.

The mode of operation of the saturating reactor $X_2$ will now be more fully described by reference to the B–H characteristic curve shown in FIGURE 7 and the flux density B versus time curve shown in FIGURE 8. It will be appreciated that the saturating reactors $X_1$ and $X_3$ shown in the other illustrated embodiments of the invention function in substantially the same manner and the detailed description which follows is equally applicable to these saturating reactors.

Referring now to the B–H characteristic curve of FIGURE 7, at zero load current the flux condition of the saturable core 27 is indicated by point $a$. At this condition the current flowing in the bias winding $N_{22}$ holds the saturable core 27 in negative saturation, the value of the flux density being given as $-B_s$. The corresponding point $-B_s$ on the flux density B versus time curve occurs at time $t_0$. When transistor $Q_1$ is switched to the low impedance condition, the current through the main winding $N_{12}$ and the load 26 rises almost instantaneously at $t_0$ to a level essentially where the ampere turns of the main winding $N_{12}$ cancel the bias winding ampere turns $N_bI_b$. This condition of the saturable core 17 is identified as point $b$ on the B–H characteristic curve of FIGURE 7, and at this point the saturating reactor $X_2$ is at the threshold of its active region.

Between the interval $t_0$–$t_1$, as will be seen in curve of FIGURE 8, the flux density rises at a linear rate from a negative value $-B_s$ to the positive saturation value $+B_s$. On the B–H characteristic curve the core condition has now changed from point $b$ to point $c$. At point $c$ the saturating reactor $X_2$ reaches positive saturation, and it can no longer support the forward voltage. As the voltage across the main winding $N_{12}$ begins to collapse, the base drive to the transistor $Q_1$ is decreased, and the transistor $Q_1$ begins to turn off. At time $t_1$, as show in the flux density waveform of FIGURE 8, the reactor becomes a voltage source, the rate of change of the flux density now being in a negative direction thereby indicating a change in the polarity of the voltage across winding $N_{12}$. On the B–H characteristic curve of FIGURE 7 the saturating reactor is going from condition $c$ to condition $d$. As the core condition moves down the nearly vertical left hand side of the hysteresis loop the current through the main winding $N_{12}$ is held at a substantially constant level. At time $t_2$ of the flux density waveform of FIGURE 8 or at point $d$ of B–H characteristic curve of FIGURE 7, the core flux density reaches the negative saturation value, $-B_s$. The saturating reactor $X_2$ is now in its recovered condition. Thus, for each complete cycle of operation, the core flux density completes an excursion from negative saturation to positive saturation and from positive saturation to negative saturation, and the total volt-second capacity of the saturable core is effectively utilized. Such a mode of operation of a saturable core results in minimum core losses and permits the voltage ratings of the saturating reactors to be designed within close limits and reductions to be achieved in the size, weight and cost of the saturating reactor.

From the foregoing description of the improved circuit of the invention and its operation, it will be apparent that the circuit is inherently current limiting. The load current is held substantially constant at a predetermined level during the conducting interval of the switching device by the D.C. bias magnetomotive force. When the load current flows through the main winding, the current immediately increases from zero to a predetermined level since essentially no back electromotive force is developed in the saturating reactor until the magnetizing magnetomotive force is equal to the bias magnetomotive force. When this occurs, the load current flow is maintained at the predetermined level because of the high impedance presented by the reactor until saturation occurs. During the period that the power from the source is interrupted, the saturating reactor provides a load current that is maintained substantially at the same level. Thus, an essentially constant amplitude unidirectional current is supplied at the output of the current limiting circuits of the invention.

An advantage of the improved arrangement as compared with conventional current limiting circuits is that high circuit efficiencies can be readily achieved. The improved circuits can be used to energize a load having a negative impedance characteristic without need for ballasting resistors. The improved circuits employ small, inexpensive components, and reactors having relatively low volt-ampere ratings because reasonably high switching frequencies are practicable.

Although in the exemplifications of the invention, the current limiting circuits were adapted to operate a resistive load and a fluorescent lamp load with a cyclical direct current, it will be apparent that the current limiting circuit is readily adaptable to alternating current applications. Further, it will be apparent that although transistors and gate-turn-off controlled rectifiers have been employed in the illustrated embodiments of the invention, other semiconductor devices may be employed. While the invention has been explained by describing various embodiments thereof, it will be apparent that many modifications may be made without departing from the spirit of the invention, and it is therefore intended to cover all such equivalent variations within the scope of the appended claims.

What I claim as new and desire to secure by Letters Patent of the United States is:

1. An apparatus for operating an electric discharge lamp from a D.C. voltage source, said circuit comprising: input means including terminal leads for connection in circuit with the D.C. voltage source, an output means including output terminal leads for connection in circuit with the electric discharge lamp, a semiconductor device operable between a low impedance and a high impedance condition, a saturating reactor including a saturable core, a main winding wound on said core and means associated with said saturating reactor for storing energy and for establishing a bias magnetomotive force in opposing relation to the magnetizing ampere-turns of said main winding to limit the current therethrough, circuit means connecting said semiconductor device and said main winding of said saturating reactor with said input and output means, means including a unidirectional device, for providing a path shunting said output means and said main winding for the energy released through said saturating reactor when said semiconductor device is in the high impedance condition, and means responsive to the condition of saturation of said saturating reactor to cause said semiconductor device to switch to the high impedance condition to allow said saturating reactor to recover, said semiconductor device being switched to a low impedance condition upon the recovery of said saturating reactor.

2. The apparatus set forth in claim 1 wherein said means associated with said saturating reactor for establishing a bias magnetomotive force in opposing relation to the magnetizing ampere-turns of said main winding is comprised of a permanent magnet.

3. The apparatus set forth in claim 1 wherein said semiconductor device is a transistor.

4. The apparatus set forth in claim 1 wherein said semiconductor device is a gate-turn-off controlled rectifier.

5. An apparatus for supplying energy from a source of potential to an electric discharge device, said apparatus comprising: a switching means operable between open and closed conditions, a saturating reactor including a main winding, means associated with said saturating reactor to provide a bias magnetomotive force in opposing relationship to the magnetizing magnetomotive force of said saturating reactor and to provide energy storage, circuit means for connecting said switching means and the main winding of said saturating reactor in circuit with the source of potential and the electric discharge device, means for providing a path shunting the source and the switching means for the energy released through the saturating reactor to the discharge device during the open condition of said switching means, and means responsive to the condition of saturation of said saturating reactor to activate said switch to an open condition thereby to interrupt the supply of energy from the source and provide a recovery period for the saturating reactor, said current through said saturating reactor being limited to a predetermined level when said magnetizing magnetomotive force equals said bias magnetomotive force, and said switching means being activated to the closed condition when the saturating reactor has substantially recovered.

6. In an apparatus for supplying an operating potential to an electric discharge device from a D.C. source, an input means for connection with the D.C. source, an output means for connection with the electric discharge device, a saturating reactor having a main winding wound on a saturable core, switching means connected in circuit with said main winding of the saturating reactor between said input and output means and responsive to the condition of saturation of the saturable core to interrupt the supply of operating potential from the source to the saturating reactor to permit the saturating reactor to recover, a D.C. bias means associated with said saturating reactor for storing energy and for applying a magnetomotive force in opposing relation to the magnetizing magnetomotive force of said main winding to hold the current supplied by the apparatus during the unsaturated condition of the reactor at a predetermined level, and means for supplying to the electric discharge device the stored energy in said bias means when the operating potential is interrupted by said switching means.

7. The apparatus set forth in claim 6 wherein said switching means is a PNP transistor.

8. The apparatus set forth in claim 6 wherein said switching means is a gate-turn-off controlled rectifier.

9. The apparatus set forth in claim 6 wherein said D.C. bias means is a permanent magnet.

10. An apparatus for operating an electric discharge device from a potential source, a semiconductor switching means operable between a low impedance and a high impedance condition, a saturating reactor having a saturable core, a main winding and an auxiliary winding disposed in inductive relation therewith on said saturable core, a D.C. bias means associated with said saturable core for storing energy and for applying a magnetomotive force to maintain the current through said main winding at a predetermined level during the unsaturated condition of the saturable core, output means including output terminals for connection in circuit with the electric discharge device and including connections placing said switching means and said main winding of said reactor in series circuit relation to provide a path for the supply of current from the source to said main winding and said output means when said switching means is in the low impedance condition, circuit means providing a path shunting the switching means and the potential source for the current released from said D.C. bias means for supplying potential to the electric discharge device when the semiconductor means is actuated to the high impedance condition, means coupled with said switching means and said auxiliary winding for controlling the operation of said semiconductor switching means, said control means actuating said switching means to the high impedance condition in response to the condition of saturation of said saturable core to permit said saturable core to recover, and means for actuating the switching means to a low impedance condition when the saturable core has recovered.

11. In an apparatus for operating an electric discharge lamp from a source of potential, input means including a pair of input terminals for connection to the source of potential, output means including a pair of output terminals for connection to the electric discharge lamp, a reactor having a saturable core, a first and second winding inductively coupled on said saturable core, means coupled with said saturating reactor for establishing a bias magnetomotive force in opposing relation to the magnetizing magnetomotive force of said first winding and including a D.C. choke, a semiconductor device having a base, emitter and collector electrodes, said device being operable between a low impedance and high impedance condition, said first winding of said saturating reactor connected in circuit with said semiconductor device between said input and output means thereby to be energized from the source of potential when the semiconductor device is in the low impedance condition, circuit means responsive to the condition of saturation of said reactor to activate said device, said means including connections coupling said second winding of said reactor across the emitter and base electrodes of said semiconductor device, and a unidirectional conducting means connected in circuit with said first winding of said reactor and said output means to provide a path for the current released from said D.C. choke during the high impedance condition of said semiconductor device, said path shunting said semiconductor device and said input means.

12. In the apparatus set forth in claim 11 wherein said circuit means includes a base drive resistor connected in series circuit with said second winding and a capacitor connected in parallel circuit relation with said base drive resistor to minimize spikes in the load current when said reactor saturates.

13. In an apparatus for operating an electric discharge lamp from a source of D.C. potential, input means including a pair of input terminals for connection to the source of D.C. potential, output means including a pair of output terminals for connection to the electric discharge lamp, a reactor having a saturable core, first, second and third windings wound on said saturable core, said first winding being connected in circuit between said input and said output means, a semiconductor device switchable between a low impedance and a high impedance condition, said semiconductor device being connected in circuit with said first winding of said reactor, said second winding of said reactor being coupled with said semiconductor device to switch said device to the high impedance condition in response to the condition of saturation of said saturable core, said third winding being adapted for connection to a source of bias current, said source including a D.C. choke, the ampere turns of said first winding being at least equal and opposite to the ampere turns of said third winding to thereby hold the current at a predetermined level during the unsaturated condition of said reactor, and said reactor sustaining the supply of current to the output means during the high impedance condition of said semiconductor device.

14. In an apparatus for supplying a limited current to a load from a D.C. source, said apparatus comprising: a pair of input terminals for connection to the D.C. source, output terminals for connection to the load, a transistor operable between a low impedance and a high impedance condition and connected in circuit with the terminals to controllably provide a path for the flow of current from the source to the output terminals, a saturating reactor having a saturable core and a main winding wound thereon, means associated with said saturable core for storing energy and for applying a magnetomotive force in opposing relationship to the magnetizing magnetomotive force of the main winding to control the current at the output terminals during the unsaturated condition of the saturable core, circuit means connecting said output terminals, said main winding and said transistor across said input terminals, and control means responsive to the condition of saturation of said core to switch said transistor to the high impedance condition to interrupt the supply of current from the D.C. source and permit said reactor to recover, said aforementioned means associated with said saturable core for storing energy thereby releasing said energy through the main winding and sustaining the flow of current to the load during the high impedance condition of said transistor, and said transistor being switched to the low impedance condition when said reactor recovers.

15. In the apparatus set forth in claim 14 wherein said control means includes an auxiliary winding inductively coupled with the main winding of said saturating reactor, a base drive resistor connected in circuit with said auxiliary winding, circuit means connecting said auxiliary winding and base drive resistor in circuit across the emitter-base junction of said transistor, and a serially connected capacitor and resistor joined in parallel circuit relation with said base drive resistor to thereby increase the switching speed of said transistor and minimize spikes in the current supplied at the output terminals when the reactor saturates.

16. An apparatus for supplying a current-limited output to a load from a D.C. source, said apparatus comprising: input leads for connection in circuit with the D.C. source, a pair of output leads for connection in circuit with the load, a unilateral switching means operable between an open and closed position, circuit means connecting said input leads in circuit with said output leads and placing said switching means and main winding in circuit with the D.C. source and the load, to provide a path for the flow of current from the D.C. source to the output leads when said switching means is in the closed condition, a saturating reactor having a saturable core and a main winding connected in circuit with said switching means, means associated with said saturable core for storing energy and for applying a bias magnetomotive force in opposing relationship to the magnetizing magnetomotive force of said main winding to hold the current at a predetermined level during the unsaturated condition of the saturable core and to release energy through the main winding during the open condition of said switching means to sustain the current flow to the load, and means responsive to the condition of said saturable core to activate the switching means to an open condition when the saturable core is near saturation and to activate the switching means to the closed position after the saturable reactor has recovered.

17. An apparatus for supplying an operating potential to a load from a D.C. source, said apparatus comprising: a saturating reactor having a main winding wound on a saturable core, said saturable core formed at a core material characterized by a substantially square hysteresis loop, means associated with said saturating reactor for storing energy and for providing a magnetomotive force in opposing relation to the magnetizing magnetomotive force of said main winding, a semiconductor switching device operable between a low impedance and a high impedance condition, a pair of terminals for connection with the D.C. source, circuit means for connecting said main winding and said semiconductor switching means in circuit with said terminals and in series circuit relation with the load, means including a unidirectional device, for providing a path for the energy released through the saturating reactor during its recovery period, and means coupled with said semiconductor switching device to switch said device to the high impedance condition when said saturable core reaches positive saturation and to switch said device to the low impedance condition when said saturable core has recovered, the flux density in said saturable core during operation completing in each cycle of operation an excursion from negative saturation to positive saturation and also an excursion from positive saturation to negative saturation, and said current level being maintained substantially constant during said excursions by said saturating reactor.

18. In an apparatus for supplying a current-limited output to a load from a D.C. source, the improvement comprising: an input means for connection with the D.C. source, an output means for connection with the load, a saturating reactor having a main winding and a saturable core made of material characterized by a substantially square hysteresis loop, means associated with said saturating reactor to store energy and to provide a bias magnetomotive force in opposing relation to the magnetizing magnetomotive force of said main winding, a semiconductor device operable between a high impedance and a low impedance condition, circuit means for connecting said main winding of said saturating reactor and said semiconductor device in circuit between said input and output means, means for providing a path for electric energy released through the main winding from said means associated with said saturating reactor to store energy, said path shunting said output means and said semiconductor switching device, means responsive to the condition of saturation of said saturable core to drive said semiconductor device to the high impedance condition thereby interrupting the supply of current from the source and allowing said saturable reactor to recover, said semiconductor device being driven to the low impedance condition when said saturable reactor recovers, said flux density in said saturable core during operation undergoing an excursion from negative saturation to positive saturation to hold said load current substantially constant during a portion of each cycle of operation and undergoing an excursion from positive saturation to negative saturation to hold the load current constant substantially during the succeeding portion of the cycle to limit the output current.

19. In an apparatus for supplying operating current to an electric discharge lamp, the combination of a saturable reactor and a semi-conductor device arranged for connection in series with said lamp across a source of operating potential, bias means including an inductive element coupled with said reactor to produce a flux to saturate said reactor in one direction when the device is non-conducting, means responsive to application of said operating potential to said series connection to produce a flux in said reactor over a predetermined interval until saturation occurs in an opposite direction, and means responsive to saturation of the reactor to render said device conducting when the reactor saturates in said one direction and to render said device nonconducting when the core saturates in said opposite direction.

20. The combination set forth in claim 19 in which the energy stored in said inductive element is discharged through said reactor when said device is nonconducting to supply current to said lamp of the same polarity and substantially the same magnitude as the current supplied thereto when said device is conducting.

References Cited by the Examiner

UNITED STATES PATENTS

| | | | |
|---|---|---|---|
| 2,964,693 | 12/1960 | Ehret | 323—89 |
| 3,066,241 | 11/1962 | Palmer | 315—200 X |
| 3,074,031 | 1/1963 | Hoge | 307—88.5 |
| 3,097,335 | 7/1963 | Schmidt | 307—88.5 |

DAVID J. GALVIN, *Primary Examiner.*